(12) United States Patent
Muramatsu

(10) Patent No.: US 7,032,094 B2
(45) Date of Patent: Apr. 18, 2006

(54) METHOD OF CONTROLLING FLASH MEMORY

(75) Inventor: Hirofumi Muramatsu, Tokyo (JP)

(73) Assignee: Oki Electric Industry Co., Ltd., Tokyo (JP)

(*) Notice: Subject to any disclaimer, the term of this patent is extended or adjusted under 35 U.S.C. 154(b) by 331 days.

(21) Appl. No.: 10/368,462

(22) Filed: Feb. 20, 2003

(65) Prior Publication Data

US 2004/0024956 A1 Feb. 5, 2004

(30) Foreign Application Priority Data

Jul. 30, 2002 (JP) ............................. 2002-220556

(51) Int. Cl.
*G06F 12/00* (2006.01)

(52) U.S. Cl. .................. 711/173; 711/103; 711/171; 714/52

(58) Field of Classification Search ............... 711/103, 711/170, 171, 173; 714/52
See application file for complete search history.

(56) References Cited

U.S. PATENT DOCUMENTS

| | | | | |
|---|---|---|---|---|
| 5,963,983 A | * | 10/1999 | Sakakura et al. | 711/202 |
| 6,711,663 B1 | * | 3/2004 | Lai et al. | 711/206 |
| 2002/0124130 A1 | * | 9/2002 | Iida et al. | 711/103 |
| 2003/0028704 A1 | * | 2/2003 | Mukaida et al. | 711/5 |
| 2004/0024956 A1 | * | 2/2004 | Muramatsu | 711/103 |
| 2004/0210708 A1 | * | 10/2004 | Conley | 711/103 |

FOREIGN PATENT DOCUMENTS

| | | |
|---|---|---|
| JP | 08-273390 | 10/1996 |
| JP | 2000-76117 | 3/2000 |
| JP | 2001-312891 | 11/2001 |
| JP | 2002-7221 | 1/2002 |

* cited by examiner

*Primary Examiner*—Brian R. Peugh
(74) *Attorney, Agent, or Firm*—Rabin & Berdo, PC

(57) ABSTRACT

In order to control efficiently a flash memory in the case where small-scale data are frequently rewritten, a method of controlling a flash memory in which a data storage region is divided into unit sectors and data can be erased by every sector as a unit, is configured that the sector comprises a sector control region and a plurality of pages, and included are both available/unavailable flag information about the page concerned and an occupied/unoccupied map showing a data storage location of the data storage region on the page concerned. By employing such a configuration, it is easy to decide whether the page referred to is available or unavailable and the configuration is suitable for frequently renewing and adding pages, which are of a large quantity and on a small scale.

12 Claims, 8 Drawing Sheets

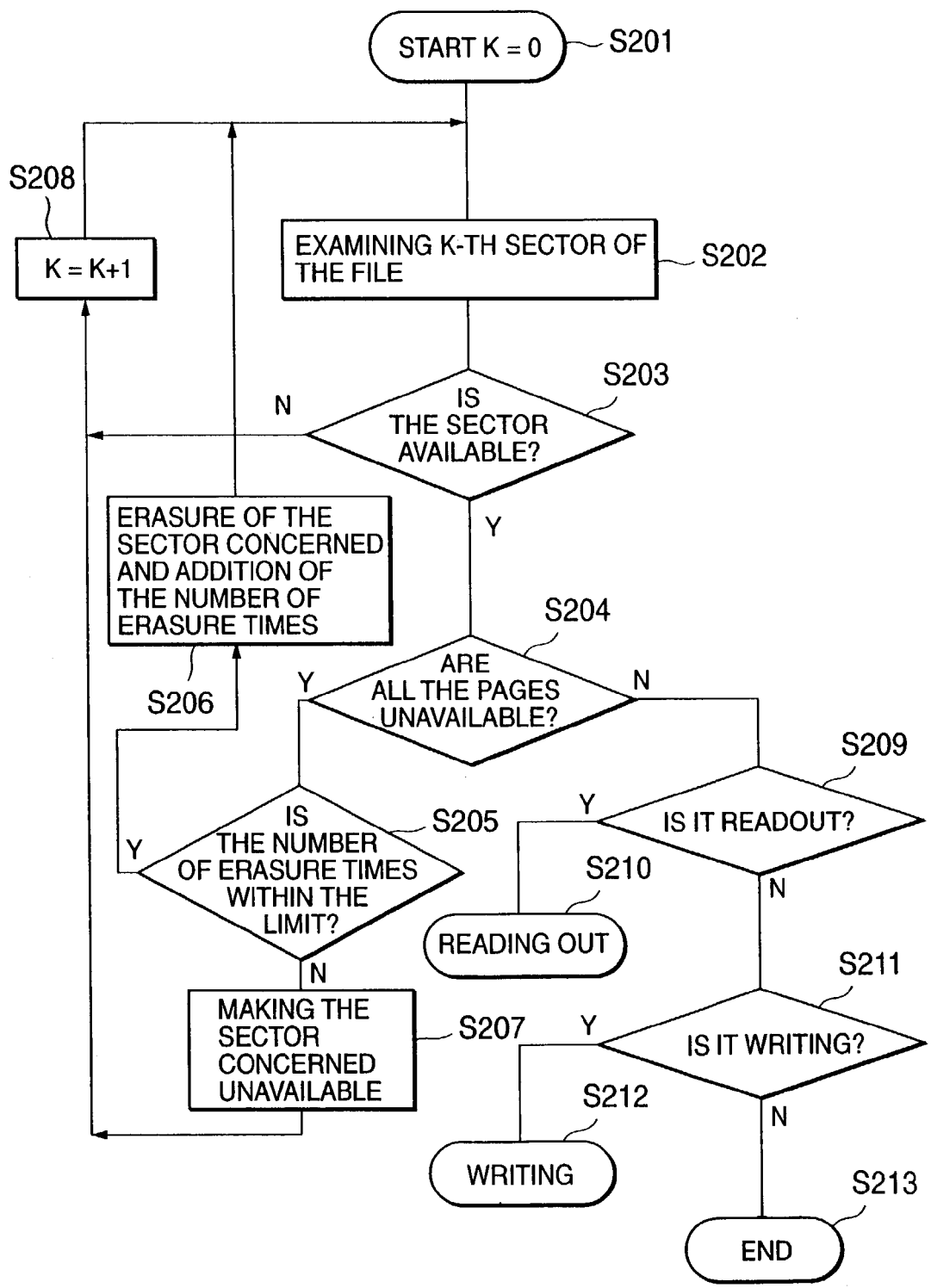

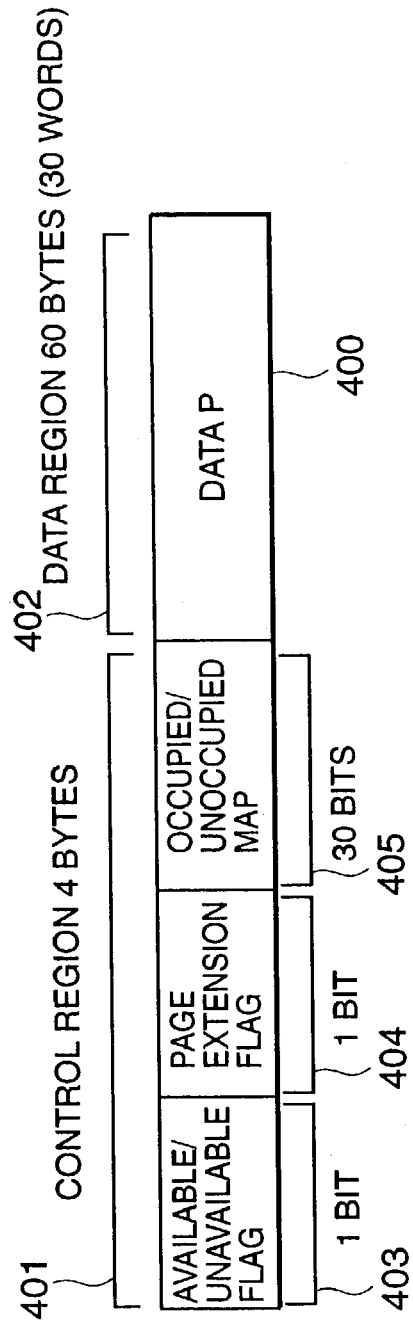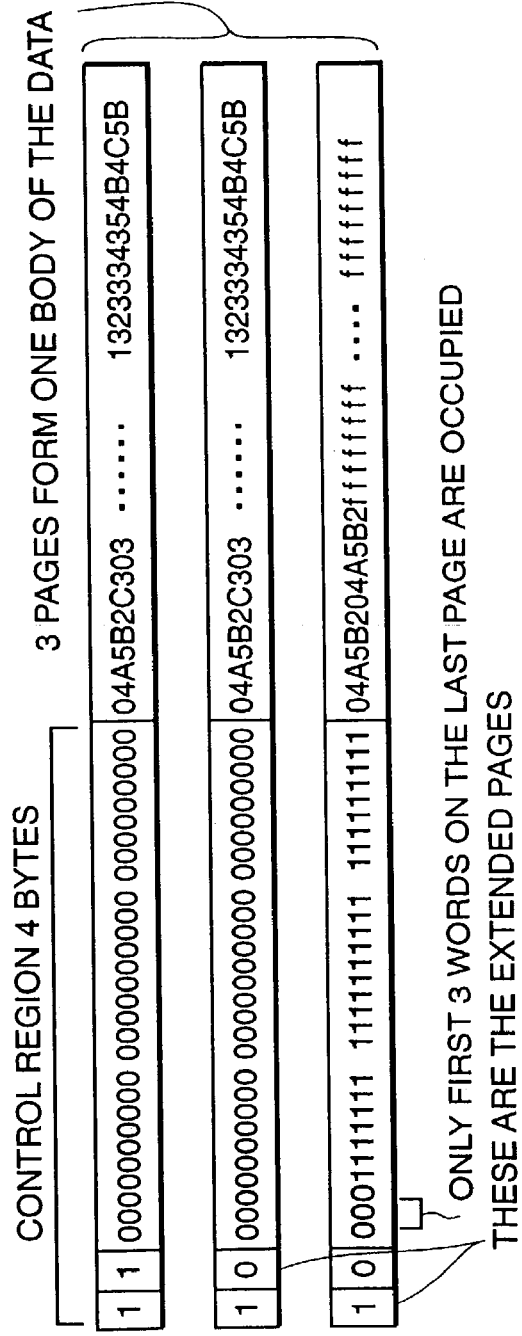

METHOD OF CONTROLLING FLASH MEMORY

BACKGROUND OF THE INVENTION

1. Field of the Invention

The present invention relates to a method of controlling a flash memory, especially a method of controlling a flash memory useful for rewriting of small-scale data used in a cellular phone, etc.

2. Description of the Related Art

Conventionally, in the field of flash memories, a minimum unit erased by 1 flash is referred to a sector and a flash memory has been controlled by the sector as a unit. However, when the size of data processed is as small as that of small-scale data containing a few bites or so such as an IP address, a MAC (Machine Address Code) address, the size of 1 sector has been an issue from the viewpoint of the efficiency of controlling memories in the application where such small-scale data are frequently accessed.

FIG. 1A is a diagram showing an example of the constitution of a conventional flash memory using the sector as the unit and it is configured that a file is divided into sectors 701, and a sector control region 702 is provided at the head of each sector, and the number of erasure-times and the information about a party linked to the sector are written in the control region. With regard to such a control method, for example, in JP, 2002-7221, A described is that a sector is divided further into smaller blocks and a writing decision region, representing whether the block concerned is already written thereon or not, is provided for each block at its head, and in JP, 2001-312891, A described is that a memory is divided into blocks and a control status writing area is provided for each memory block, and in JP, 08-273390, A described is that a block storage area for the data of the number of erasure times is provided for each block at its head.

FIG. 1B shows a method of controlling a memory described in JP, 2000-76117, A and each sector is composed of a plurality of small blocks 703, and each small block comprising 256 bytes is composed of a control region 704 with 6 bytes and a data storage region with 250 bytes. The control region 704 in this case comprises a file number 706, a sector number 707 of the following storage portion, a small block address 708 showing the linkage to other small blocks, and an available/unavailable code 709 representing whether the data of the small block are available or unavailable.

However, by means of the conventional methods above, when small-scale data are frequently rewritten in such an application as to enclose a small-scale data like an IP address of the Internet in a flash memory inside a cellular phone, working efficiency of the memory may not have been said to be sufficient.

SUMMARY OF THE INVENTION

In order to control efficiently a flash memory in the case where small-scale data are frequently rewritten, a method of controlling a flash memory in which a data storage region is divided into unit sectors and data can be erased by every sector as a unit, is configured that the sector comprises a sector control region and a plurality of pages, and included are both available/unavailable flag information about the page concerned and an occupied/unoccupied map showing a data storage location of the data storage region on the page concerned. By employing such a configuration, it is easy to decide whether the page referred to is available or unavailable and the configuration is suitable for frequently renewing and adding pages, which are of a large quantity and on a small scale.

BRIEF DESCRIPTION OF THE DRAWINGS

FIG. 3 is an operation (sector control) flow diagram of a control program in the 1st embodiment.

FIGS. 6A, 6B are diagrams showing the structure of data in the 2nd embodiment.

DETAILED DESCRIPTION OF THE INVENTION

Figure 1A:
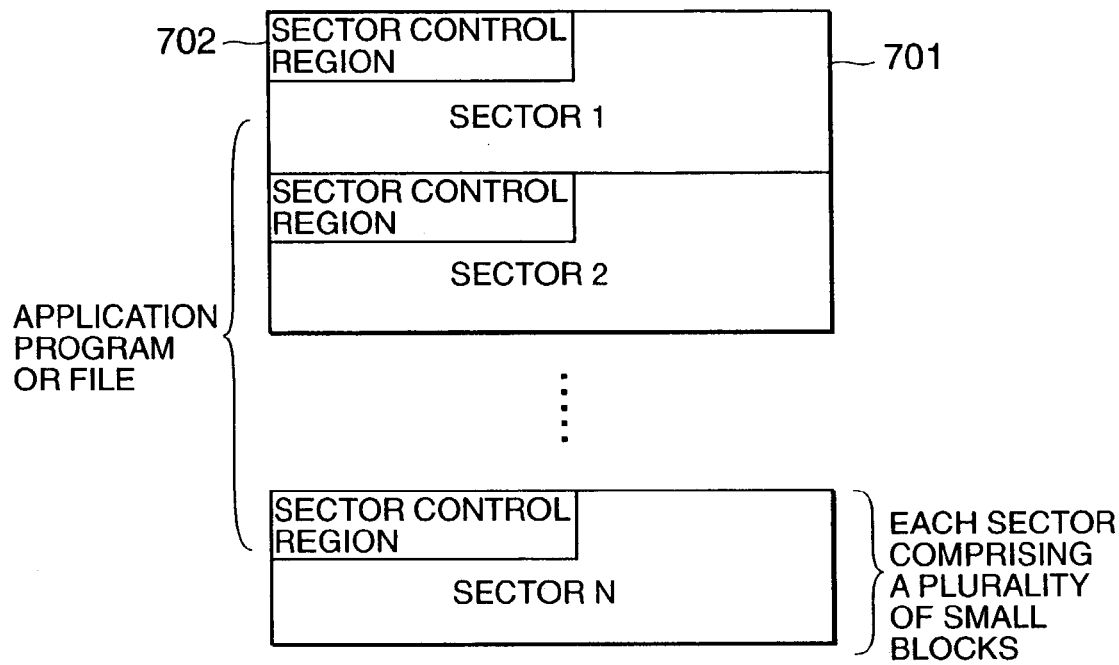
FIGS. 1A, 1B are illustrations of conventional art.
Figure 1B:
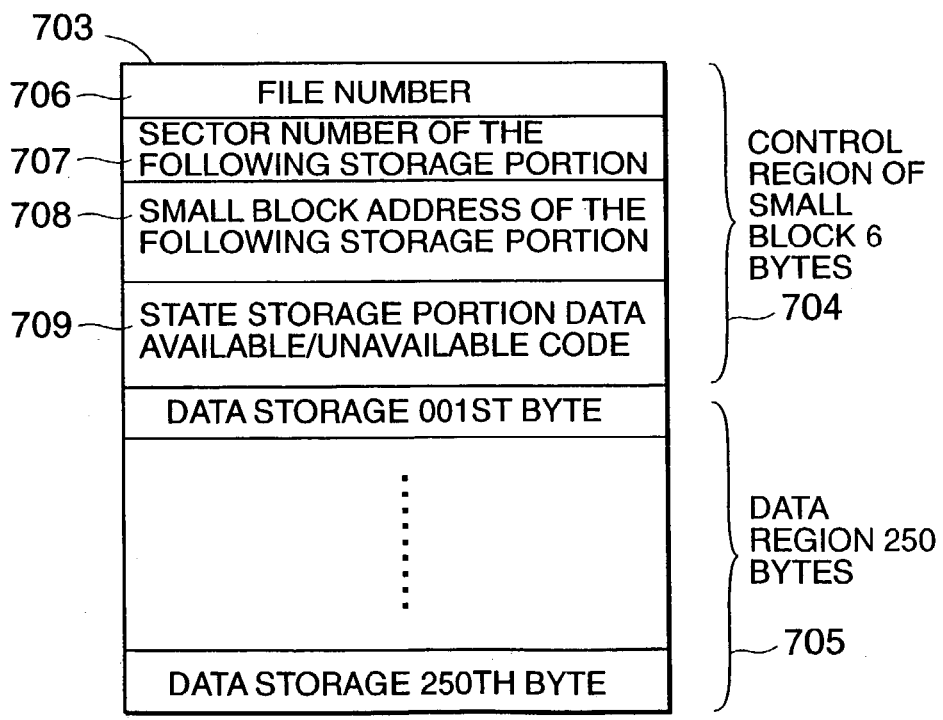

In the following, the embodiments of the present invention will be described using the drawings. Besides, in the drawings, the size, the shape, the configuration, etc. of each constituent are shown only so schematically as to understand the present invention, and numerical requirements described below are given as mere illustrations.

[1st Embodiment]

Figure 2A:
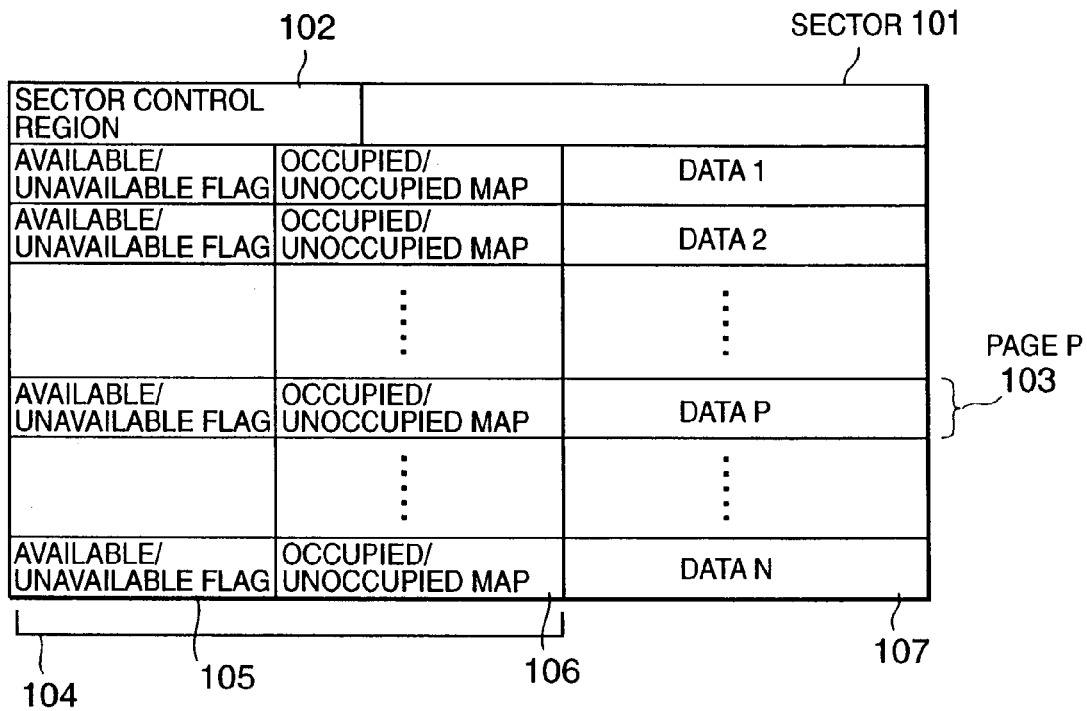
FIGS. 2A, 2B, 2C are diagrams showing the structure of data in the 1st embodiment of the present invention.

FIG. 2A shows the structure of a sector of a flash memory in the 1st embodiment of the present invention, and the interior of 1 sector 101, an erasure unit of the flash memory is configured to be divided into a sector control region 102 and a number of pages 103. In the sector control region 102 included are pieces of information such as an available/unavailable flag showing whether the sector is already used up or not, the number of erasure times.

Figure 2B:
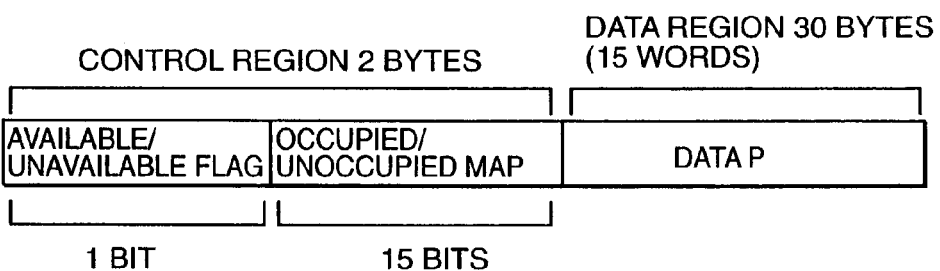

The 1 page is divided into a page control region 104 and a data region 107, and the page control region is composed of an available/unavailable flag 105 and a occupied/unoccupied map 106. In this embodiment, the 1 sector (32 k bytes) is divided into 1024 pages, and the sector control region is assigned to one of the pages, and the remaining 1023 pages are used as the data region. Further, as shown in FIG. 2B, each page 103 is composed of 32 bytes, and the page control region 104 comprises 2 bytes in which 1 bit is used for the available/unavailable flag and the remaining 15 bits are used for the used/unused map. Therefore, the data capacity of each page is 30 bytes.

The meaning of the available/unavailable flag is as follows. That is to say, when the bit value is "1" it represents that the data is at the state as initialized, and when "0" it represents that the data is unavailable and has been excluded already.

With regard to the occupied/unoccupied map 106, all the bits are "1" at the initial state, and each bit represents that the corresponding word in the data region is unused when the bit is "1", and that the corresponding word in the data region is now used when the bit is "0". Accordingly, at the initial state, namely the state immediately after erasure of the sector concerned, all the pages composing the sector are available and unused at the same time.

Figure 2C:
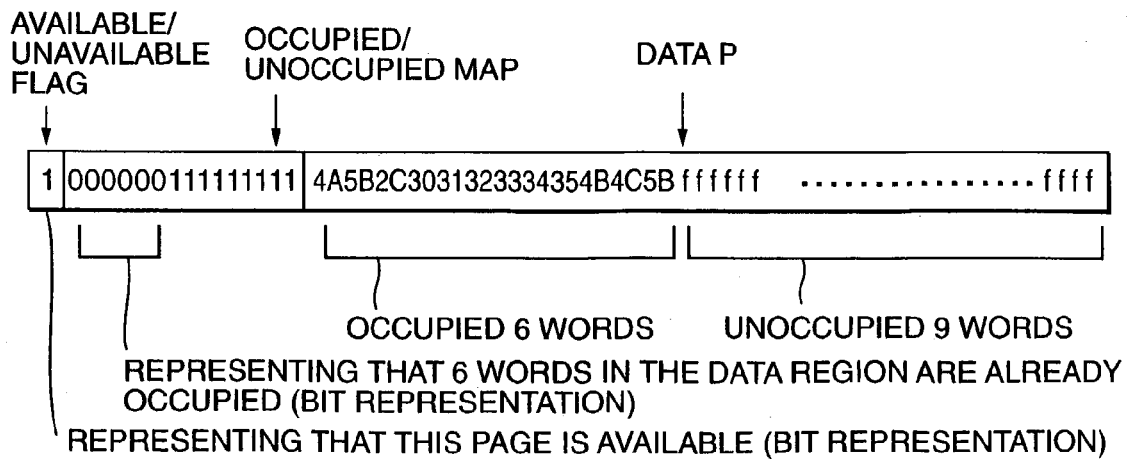

FIG. 2C shows an example of page data, and the fact that the available/unavailable flag is "1" shows that this page is available including available data therein. With regard to the following occupied/unoccupied map according to the example shown in the figure, since 6 bits at the head is are "0" and 9 bits at the back are "1", it is shown that 6 words (12 bytes) at the head in the data region are now occupied and 9 words (18 bytes) at the back are an unoccupied region. All the bits of the data in the unused region are "1".

When writing is executed on a flash memory, the writing can be done by 1 byte or by 1 word as a unit by means of specifying the address thereof. In the example of the data structure shown in this embodiment, when both control data and essential data are accessed, a method of accessing by every 1 word is preferable. Further, since 1 page comprises 32 bytes (16 words), it is advantageous when the sectors are divided into the pages.

In the case where necessity of adding new data occurs, 2 methods of how to use the pages can be counted in this embodiment. The first one is a usual writing method wherein an available and unused page is retrieved from the head of the sector concerned and then the data is written into the unused sites of the occupied/unoccupied map. In the case where the page is filled and data cannot be added therein, it turns necessary to write the data from the head of a new page and it is recorded, by setting the bit concerned of the occupied/unoccupied map to "1", that the region used at the moment is now occupied. The second one, in the case where data about the same information has been written already and the data must be renewed, is a method for renewing data wherein the page concerned is made unavailable by setting the available/unavailable flag to "0" while data of the page are read out at another location, and the page is renewed with the data read out beforehand at another location and then the data is written in an unoccupied page. However, the renewal is intended only for the data and overwriting at the same location is not performed.

Since the sector concerned is not yet erased during these operations, the data can be renewed promptly. Further, since excluding (making unavailable) the data is executed by the page as a unit and the data on the page are controlled by the word, the memory region can be used without waste compared to the conventional small block structure.

Figure 4:
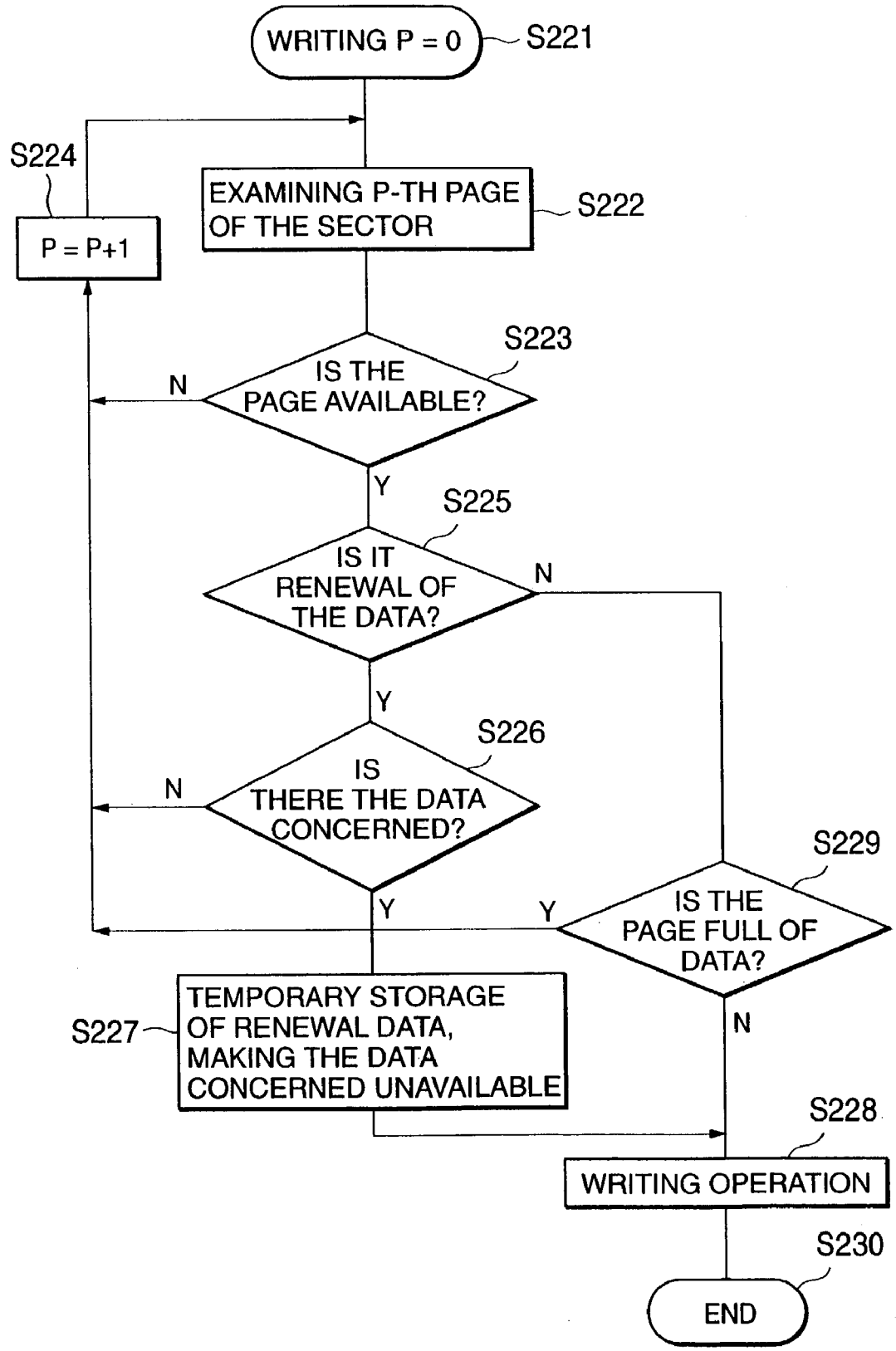
FIG. 4 is an operation (data writing) flow diagram of the control program in the 1st embodiment.
Figure 5:
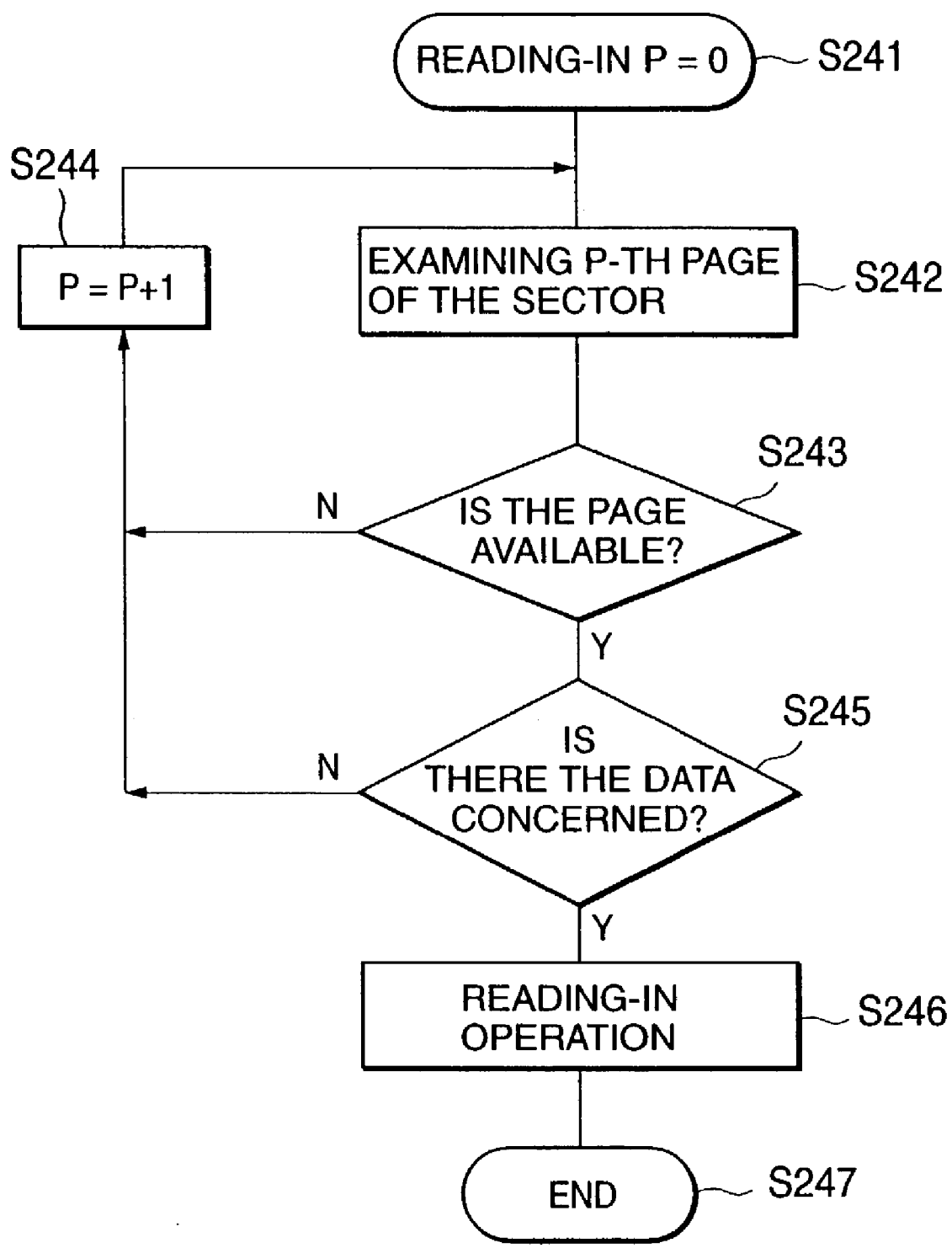
FIG. 5 is an operation (data read-in) flow diagram of the control program in the 1st embodiment.

FIG. 3–FIG. 5 shows the operation flow of the memory control program in the 1st embodiment, and FIG. 3 is a control flow diagram showing how the control program controls sectors composing a file.

Starting from a variable K=0 (S201), the K-th sector of the file is decided available/unavailable by means of said flag (S202). If the sector is not available at the time, the variable K is stepped forward at the step S208, returning to the step S202 in order to examine the next sector, and if the sector is available at the step S203, all the pages of the sector are decided whether they are unavailable or not (S204). If all the pages are unavailable, the number of erasure times is decided at the step S205 whether it is within the limit or not, and if it is within the limit, the sector concerned is erased in order to reutilize itself adding 1 to the number of erasure times of the sector in the sector control region 104 (S206), and if it is beyond the limit, the sector concerned is made unavailable (S207) returning to the step S208 in order to retrieve the next sector.

At the step S204, if there are any available pages for the present sector, the contents of the present operation is examined to decide whether it is reading out or not (S209), and if it is reading out, a readout operation is executed (S210), and if not, the operation is examined whether it is writing or not (S211), and if it is writing, a writing operation is executed (S212), and if it is neither the readout nor the writing, the operation is ceased (S213).

FIG. 4 is a writing flow diagram along which the control program writes data on an available page. Starting as a variable P=0 (S221), the P-th page is decided by means of the available/unavailable flag (S222, S223). If the page is unavailable, the variable P is stepped forward at the step S224, returning to the step S222 in order to examine the next page, and if the page is available, the present writing operation is examined whether it is renewal of the data or not (S225), and if it is the renewal of the data, whether there is any renewal data or not is examined (S226), and if there is any renewal data in the page, while the renewal data is stored for a time, the data is written (S228) after making the page concerned unavailable (S227). Here, the renewal means to renew the data by writing them on an unoccupied page and overwriting at the same location is not performed.

At the step S226, if there is not any data concerned for renewal, the operation returns to the step S224 in order to retrieve the next page.

At the step S225, if the present writing operation is not the renewal operation of the data, the page is examined whether it is dataful or not (S229). If it is not dataful, the writing operation is executed, and if dataful, the operation returns to the step S224 in order to retrieve the next page. After completion of the writing operation (S228) the operation is ceased (S230).

FIG. 5 is a reading-in flow diagram along which the control program read in data from an available page.

Starting at a variable P=0 (S241), the page concerned is decided available/unavailable by means of an available/unavailable flag on the P-th page of the sector (S242, S243), and if the page is decided to be unavailable, the variable P is stepped forward at the step S244, returning to the step S242 in order to examine the next page. If the page is decided to be available at the step S243, it is examined whether any data concerned exist or not (S245), and if any, a reading-in operation is executed (S246) to cease the operation (S247). If there exist no data concerned at the step S245, the operation returns to the step S244.

At the steps S226, S245 in the flows of FIGS. 4, 5 it is detected whether the data concerned exist or not, and although it turns necessary to make beforehand the data correspondent to the address of the location at which they are reserved, the occupied/unoccupied map 106 is used for the purpose in this embodiment. In the case where the occupied/unoccupied map 106 is not employed, it should be necessary to provide another data control region or for the data itself to retain a piece of information, for identifying the self in order to decide whether the data must be renewed or not. Further, the decision whether the page is available or not can be done by means of reading 1 word at the head of the page to examine the most significant bit of the 1 word. Consequently, unavailable pages can be decided promptly. Further, the decision whether any writable regions exist on the available page or not can be done by examining this 1 word at the head.

[2nd Embodiment]

FIGS. 6A, 6B are the diagrams showing the 2nd embodiment of the present invention, having the structure extended further than the data structure in the 1st embodiment.

FIG. 6A shows the structure of a page formed in a sector of a flash memory according to the 2nd embodiment. Here, assigning 4 bytes to a control region 401, 60 bytes to a data region, the entire 1 page 400 comprises 64 bytes.

The control region 401 comprises an available/unavailable flag 403, a page extension flag 404, and an occupied/unoccupied map 405. The available/unavailable flag 403 and the occupied/unoccupied map 405 correspond to the available/unavailable flag 105 and the occupied/unoccupied map 106 respectively in the 1st embodiment.

The page extension flag 404 means that the page concerned is dependent on the 1-page preceding page when it is "0", and that the page concerned is an independent page not dependent on any other pages when its value is "1". The available/unavailable flag 403 has priority over the page extension flag 404. However, since the page extension flag is available even when the page has turned unavailable, it is probable that there exists a page dependent on the page having turned unavailable.

In this embodiment, the occupied/unoccupied map comprises 30 bits, and the fact means that it can control the data region 402 within 30 words.

FIG. 6B shows an example of the page extended data, and as the page extension flag on the first page is "1" and the page extension flags on the following 2 pages are "0", it represents that the following 2 pages are dependent on the 1 page at the head and the total of 3 pages composes one body of the data. On the first 2 pages, as all the values of the occupied/unoccupied maps are "0", all the words in the data regions are occupied, and as only 3 bits at the head in the occupied/unoccupied map on the last page are "0", it represents that only 3 words (6 bytes) at the head of the data region are occupied.

Besides, with regard to the structure of data in this embodiment, in order to decide whether the present page is the last page or not, it is necessary to refer to the page extension flag on the next page.

[3rd Embodiment]

Figure 7A:
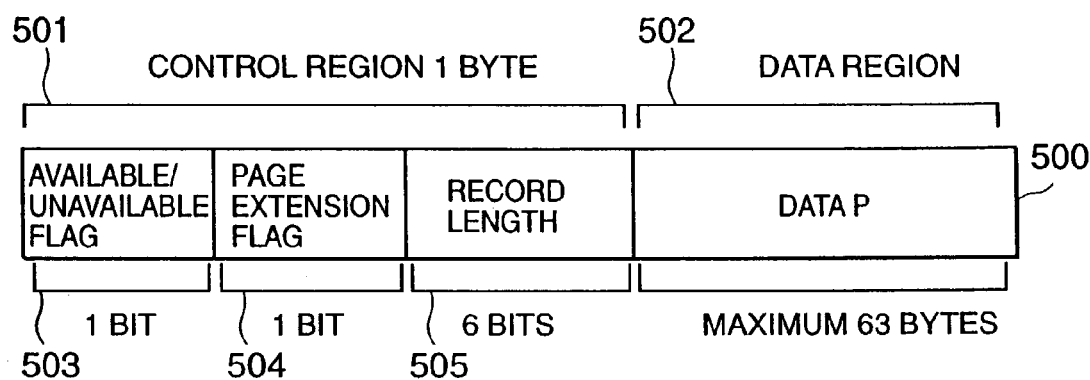
FIGS. 7A, 7B are diagrams showing the structure of data in the 3rd embodiment.
Figure 7B:
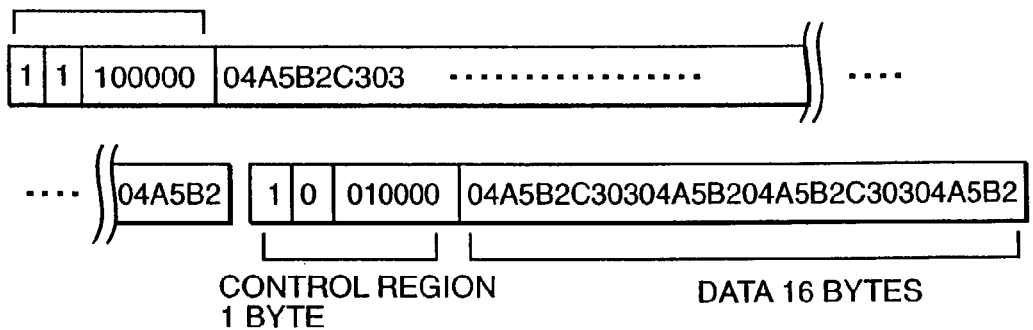

FIGS. 7A, 7B are the diagrams showing the 3rd embodiment of the present invention. According to this embodiment, differing from the 1st and 2nd embodiments, the structure is configured to treat of variable-length data.

FIG. 7A shows the structure of a variable-length page. In this embodiment, 1 byte is assigned to a control region 501 of the variable-length page 500 and a data region 502 is of variable-length. The control region 501 comprises an available/unavailable flag 503, a page extension flag 504, and a record length 505. Among these items, the available/unavailable flag 503 and the page extension flag 504 correspond to the available/unavailable flag 403 and the page extension flag 404, respectively. Since the record length 505 is introduced, the occupied/unoccupied map in the 1st and 2nd embodiments is not required. Although a data length can be specified within 64 words at its maximum because the record length comprises 6 bits, it is set to 63 bytes at its maximum in the present embodiment, for fine setting by the byte and considering the total length of a page. Thereby, the maximum length of 1 page is 64 bytes.

Since an occupied region is apparent by making the data length of variable-length without employing the occupied/unoccupied map, there is a merit that memory regions can be used without waste. Further, the configuration is configured to be convenient for frequently rewriting small-scale data.

FIG. 7B shows an example of a variable-length page data in the 3rd embodiment. The fact that a bit at the head of the control region composed of 1 byte is "1" represents that this page is available, and the fact that a page extension flag is "1" represents that this page is an independent page and not an extended page. A record length is "100000", and represents that data length is 32 bytes.

With regard to the next page, as a bit at the head is "1" it represents that this page is available, and as a page extension flag is "0" it represents that this page is an extended page dependent on the preceding page. Further, as a record length of the page is "010000" it represents that the data length is 16 bytes. It is convenient that small-scale data with the same attribute can be added sequentially to an original page with such extended pages.

Figure 8A:
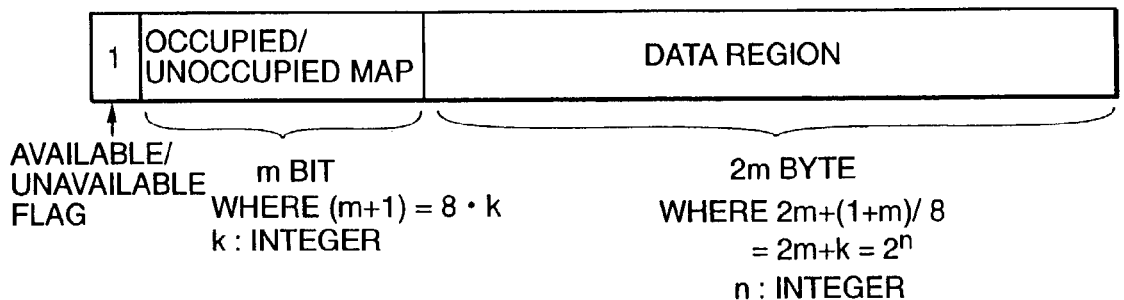
FIGS. 8A, 8B, 8C are diagrams showing the general structure of page control regions in the 1st, 2nd, 3rd embodiment respectively.

Besides, the present invention should not be limited to the above embodiment but can be changed into a various form on the basis of the gist of the present invention. For example, in the 1st embodiment, although 1 page comprises 32 bytes including a page control region, which is composed of a available/unavailable flag with 1 bit and an occupied/unoccupied map with 15 bits, and a data region composed of 30 bytes, it can be generalized such that 1 page comprises an available/unavailable flag composed of 1 bit, an occupied/unoccupied map composed of m bits selecting the m value in order to make (m+1) bits equal to 8 times an integer, and the data region composed of 2m bytes further selecting in order to make $2m+(1+m)/8=2^n$ bytes (refer to FIG. 8A).

Figure 8B:
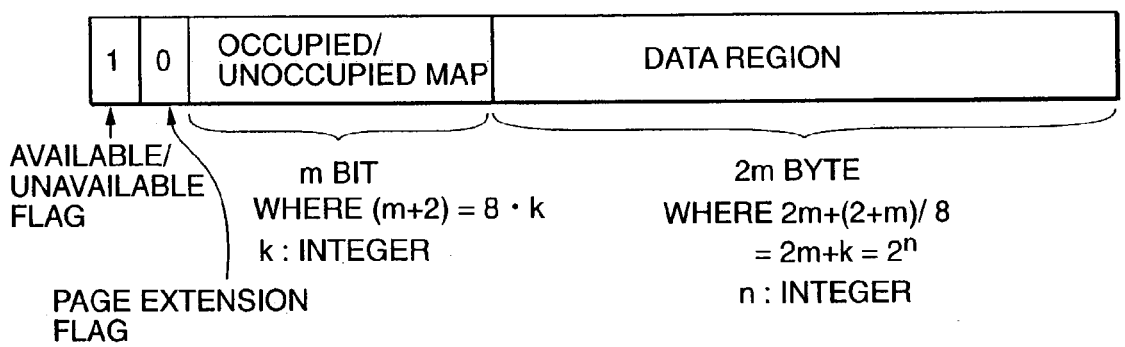

Moreover, in the 2nd embodiment, although 1 page comprises 64 bytes including a page control region, which is composed of a available/unavailable flag with 1 bit, an page extension flag with 1 bit and an occupied/unoccupied map with 30 bits, and a data region composed of 60 bytes, it can be generalized such that 1 page comprises an available/unavailable flag and a page extension flag composed of 1 bit respectively, an occupied/unoccupied map composed of m bits selecting the m value in order to make (m+2) bits equal to 8 times an integer, and the data region composed of 2m bytes further selecting in order to make $2m+(2+m)/8=2^n$ bytes (refer to FIG. 8B).

Figure 8C:
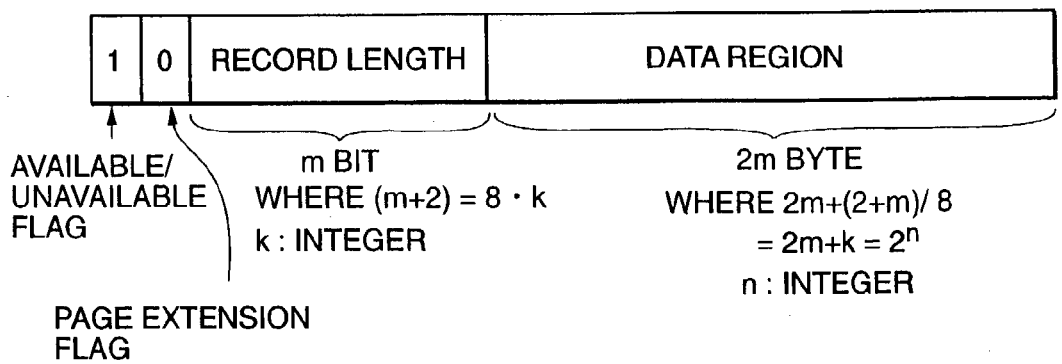

Further, in the 3rd embodiment, although 1 page comprises 64 bytes including a page control region, which is composed of a available/unavailable flag with 1 bit, an page extension flag with 1 bit and a record length with 6 bits, and a data region composed of 63 bytes, it can be generalized such that 1 page comprises an available/unavailable flag and a page extension flag composed of 1 bit respectively, a record length composed of m bits selecting the m value in order to make (m+2) bits equal to 8 times an integer, and the data region composed of 2m bytes further selecting in order to make $2m+(2+m)/8=2^n$ bytes (refer to FIG. 8C).

What is claimed is:

1. A method of controlling a flash memory in which a data storage region of the flash memory is divided into unit sectors and the data storage region is erasable by sectors as units, wherein:

each sector comprises a sector control region and a plurality of pages, each of said plurality of pages comprises a page control region that includes a piece of available/unavailable flag information about the page concerned and an occupied/unoccupied map representing data storage locations in the page concerned, said available/unavailable flag of each of said plurality of pages is composed of 1 bit, said occupied/unoccupied map of each of said plurality of pages is composed of m bits, and each of said plurality of pages further comprises a data region composed of 2m bytes, where m is a value selected in order to make (m+1) bits equal to 8 times an integer and in order to make $2m+(1+m)/8=2^n$ bytes, where n is an integer.

2. A method of controlling a flash memory in which a data storage region of the flash memory is divided into unit sectors and the data storage region is erasable by sectors as units, wherein:

each sector comprises a sector control region and a plurality of pages, each of said plurality of pages comprises a page control region that includes a piece of available/unavailable flag information about the page concerned and an occupied/unoccupied map representing data storage locations in the page concerned, and the page control region of each of said plurality of pages further includes a page extension flag, representing whether the page concerned is dependent on a preceding page or not.

3. The method of claim 2, wherein said available/unavailable flag of each of said plurality of pages is composed of 1 bit, said occupied/unoccupied map of each of said plurality of pages is composed of m bits, said page extension flag of each of said plurality of pages is composed of 1 bit, and each of said plurality of pages further comprises a data region composed of 2m bytes, where m is a value selected in order to make (m+2) bits equal to 8 times an integer and in order to make $2m+(2+m)/8=2^n$ bytes, where n is an integer.

4. A method of controlling a flash memory in which a data storage region of the flash memory is divided into unit sectors and the data storage region is erasable by sectors as units, wherein each sector comprises a sector control region and a plurality of pages, and each of said plurality of pages comprises a page data region having a record size that is variable in length, and a page control region that includes a piece of available/unavailable flag information about the page concerned, a page extension flag representing whether the page concerned is dependent on a preceding page or not, and record size information about the page data region of the page concerned.

5. The method of claim 4, wherein said available/unavailable flag of each of said plurality of pages is composed of 1 bit, said page extension flag of each of said plurality of pages is composed of 1 bit, said record size information of each of said plurality of pages is composed of m bits at its maximum, and said data region of each of said plurality of pages is composed of 2m bytes, where m is a value selected in order to make (m+2) bits equal to 8 times an integer and in order to make $2m+(2+m)/8=2^n$ bytes, where n is an integer.

6. A method for organizing a flash memory having a data storage region, comprising:

dividing the data storage region into a plurality of sectors;

dividing each sector into a sector control region and a plurality of pages; and dividing each page into a page control region and a page data region, wherein the page control region of each page includes a plurality of items of information about the page concerned, the plurality of items of information including an available/unavailable flag.

7. The method of claim 6, wherein the items of information included in the page control region of each page additionally include an occupied/unoccupied map representing data storage locations in the page concerned.

8. The method of claim 7, wherein the available/unavailable flag of each page is composed of one bit, the occupied/unoccupied map of each page is composed of m bits, and the page data region of each page is composed of 2m bytes, where m is a value selected in order to make (m+1) equal to 8 times an integer.

9. The method of claim 7, wherein the items of information included in the page control region of each page additionally include a page extension flag, representing whether the page concerned is dependent on a preceding page or not.

10. The method of claim 9, wherein the available/unavailable flag of each page is composed of one bit, the occupied/unoccupied map of each page is composed of m bits, the page extension flag of each page is composed of one bit, and the page data region of each page is composed of 2m bytes, where m is a value selected in order to make (m+2) equal to 8 times an integer.

11. The method of claim 6, wherein the page data regions are variable in length, and wherein the items of information included in the page control region of each page additionally include a page extension flag representing whether the page concerned is dependent on a preceding page or not, and record size information about the length of the page data region of the page concerned.

12. The method of claim 11, wherein the available/unavailable flag of each page is composed of one bit, the page extension flag of each page is composed of one bit, the record size information of each page is composed of a maximum of m bits, and the page data region of each page is composed of 2m bytes, where m is a value selected in order to make (m+2) equal to 8 times an integer.

* * * * *